(12) United States Patent
Holmes et al.

(10) Patent No.: US 10,272,324 B2
(45) Date of Patent: Apr. 30, 2019

(54) CLASSIFYING COLLISION EVENTS USING INERTIAL AND AUDIO DATA

(71) Applicants: Steven T. Holmes, Redwood City, CA (US); Jason Wright, Santa Cruz, CA (US)

(72) Inventors: Steven T. Holmes, Redwood City, CA (US); Jason Wright, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 14/998,163

(22) Filed: Dec. 24, 2015

(65) Prior Publication Data

US 2017/0182405 A1    Jun. 29, 2017

(51) Int. Cl.
| | |
|---|---|
| *A63F 13/211* | (2014.01) |
| *A63H 33/00* | (2006.01) |
| *A63F 13/215* | (2014.01) |
| *A63F 13/428* | (2014.01) |
| *A63B 69/02* | (2006.01) |
| *A63H 33/22* | (2006.01) |
| *A63H 5/00* | (2006.01) |
| *F41B 15/02* | (2006.01) |
| *A63F 13/424* | (2014.01) |
| *A63B 69/38* | (2006.01) |

(Continued)

(52) U.S. Cl.
CPC ............ *A63F 13/211* (2014.09); *A63B 69/02* (2013.01); *A63F 13/215* (2014.09); *A63H 5/00* (2013.01); *A63H 33/009* (2013.01); *A63H 33/22* (2013.01); *F41B 15/02* (2013.01); *A63B 69/38* (2013.01); *A63B 71/0669* (2013.01); *A63B 2069/0008* (2013.01); *A63B 2069/0044* (2013.01); *A63B 2220/40* (2013.01); *A63B 2220/44* (2013.01); *A63B 2220/801* (2013.01); *A63B 2220/803* (2013.01); *A63B 2220/808* (2013.01); *A63B 2220/833* (2013.01); *A63B 2225/50* (2013.01); *A63F 13/424* (2014.09); *A63F 13/428* (2014.09)

(58) Field of Classification Search
None
See application file for complete search history.

(56) References Cited

U.S. PATENT DOCUMENTS 3,920,242 A * 11/1975 Reith .................... A63B 69/02
463/47.1
7,247,097 B2 * 7/2007 Woolston ................ A63F 13/10
273/148 B (Continued)

OTHER PUBLICATIONS

Robert S. Durst et al., Object Classification from Analysis of Impact Acoustics, 1995 IEEE, Robotics Institute Carnegie Mellon University, 6 pages.

(Continued)

*Primary Examiner* — James S McClellan
*Assistant Examiner* — Peter Iannuzzi
(74) *Attorney, Agent, or Firm* — Jordan IP Law, LLC

(57) ABSTRACT

Systems, apparatuses and methods may obtain motion data, obtain audio data, and detect a collision between a handheld device and an object based on the motion data and the audio data. In one example, noise may be removed from the motion data and the audio data to obtain filtered collision data, wherein the object is classified based on the filtered collision data.

25 Claims, 3 Drawing Sheets

(51) Int. Cl.
 *A63B 71/06* (2006.01)
 *A63B 69/00* (2006.01)

(56) References Cited

U.S. PATENT DOCUMENTS

| | | | |
|---|---|---|---|
| 2010/0198528 A1* | 8/2010 | McCauley | A63B 24/0021 |
| | | | 702/41 |
| 2011/0098094 A1* | 4/2011 | Forsell | A63B 69/004 |
| | | | 463/8 |
| 2015/0126260 A1* | 5/2015 | Lynch | A63F 13/211 |
| | | | 463/8 |
| 2015/0251071 A1* | 9/2015 | Steusloff | A63B 69/3632 |
| | | | 702/141 |
| 2017/0368443 A1* | 12/2017 | Foxworth | A63B 71/0669 |

OTHER PUBLICATIONS

Intel Curie Module, Intel News Fact Sheet, Aug. 18, 2015, Intel Corporation, 2 pages.

* cited by examiner

CLASSIFYING COLLISION EVENTS USING INERTIAL AND AUDIO DATA

TECHNICAL FIELD

Embodiments generally relate to detecting and classifying collisions between handheld devices and other objects. More particularly, embodiments relate to detecting and classifying collision events in handheld devices using inertial and audio data.

BACKGROUND

Many applications may involve the analysis of collisions between a rigid object and different materials. In sword-based competitions, for example, the ability to automatically detect collisions between a handheld sword and another object may be valuable. Conventional solutions, however, may rely on the other object (e.g., an opponent) being covered with specific materials or clothing that closes an electric circuit when contacted by the end of the sword. Such an approach may be costly and inconvenient to the participants.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
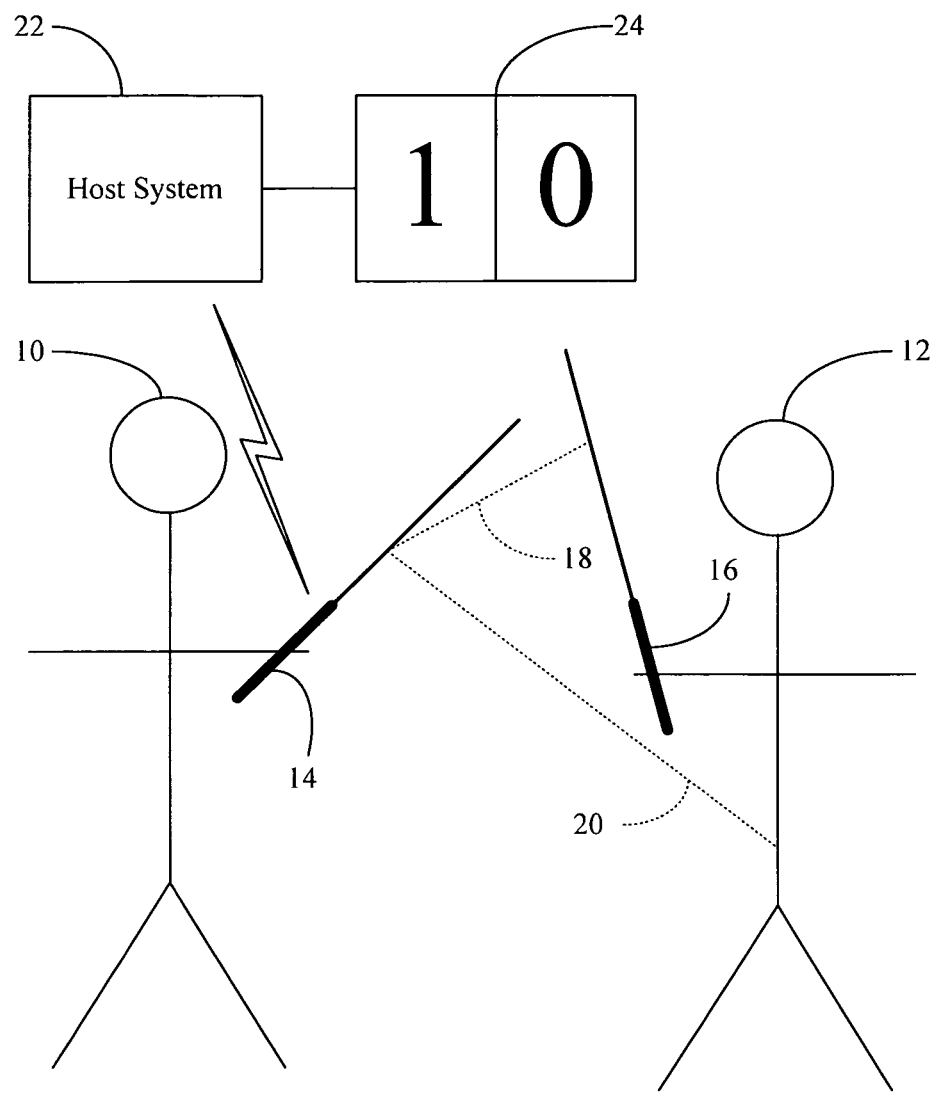
FIG. 1 is an illustration of an example of an automated collision classification environment according to an embodiment.

Turning now to FIG. 1, an environment is shown in which a first individual 10 participates with a second individual 12 in a competitive activity. In the illustrated example, the first individual 10 carries and/or brandishes a first handheld device 14 and the second individual 12 carries and/or brandishes a second handheld device 16, wherein the first and second handheld devices 14, 16 have housings with a sword form factor (e.g., saber, foil, epee, blade). As will be discussed in greater detail, the first and second handheld devices 14, 16 may be configured to use motion and audio signals to detect collisions as well as to classify the objects collided with.

For example, the first handheld device 14 may distinguish between a first strike event 18 in which the first handheld device 14 comes into contact with a blade of the second handheld device 16 and a second strike event 20 in which the first handheld device 14 comes into contact with a body part of the second individual 12. Moreover, the illustrated first handheld device 16 wirelessly streams collision information (e.g., collision events and object classifications) to a host system 22, which may update a scoreboard 24 in response to the collision information. For example, a point might be automatically awarded to the first individual 10 in response to the second strike event 20, whereas no points may be awarded in response to the first strike event 18. The illustrated solution may therefore obviate any need for the individuals 10, 12 to wear special clothing or materials in order to detect and/or classify collisions. As a result, cost may be reduced and user convenience may be enhanced.

Figure 2:
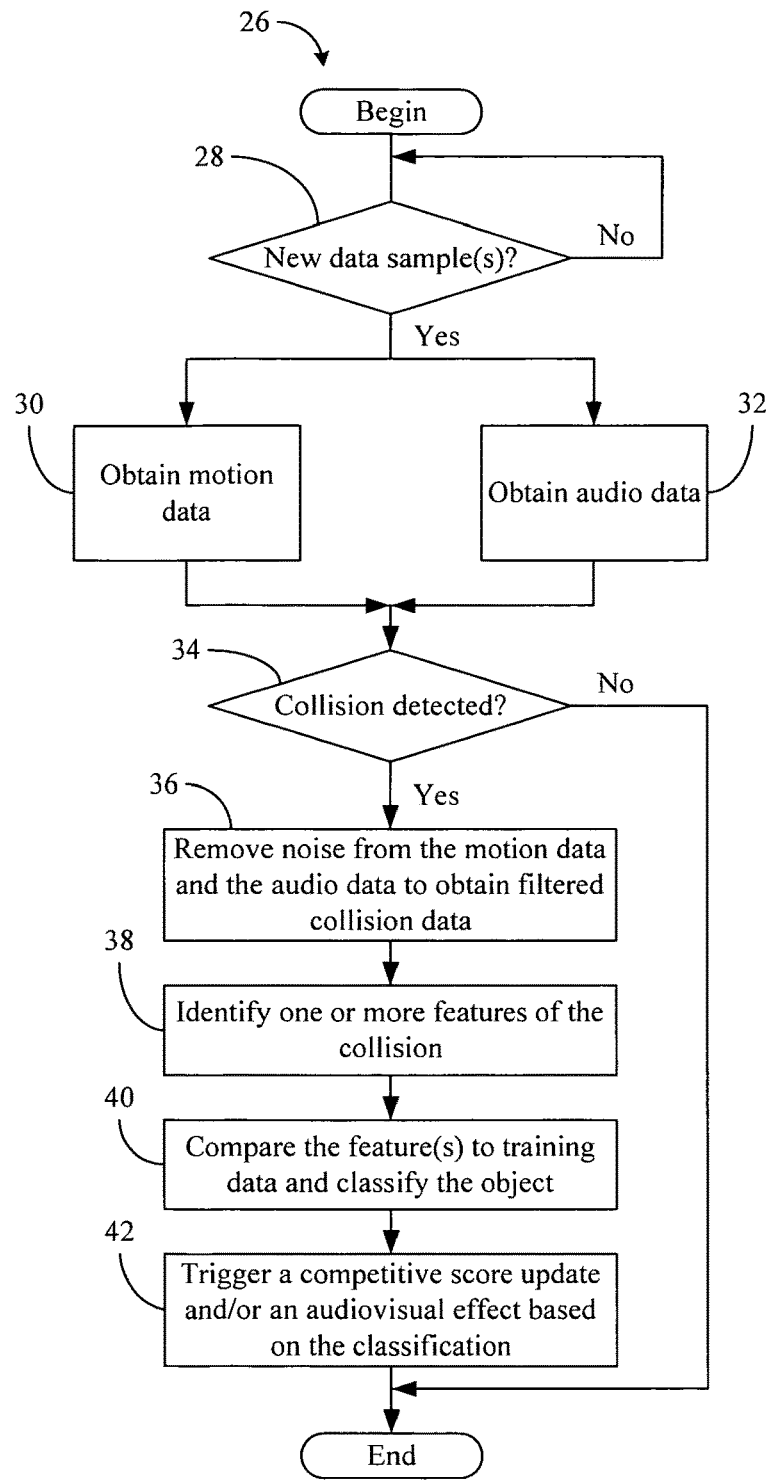
FIG. 2 is a flowchart of an example of a method of operating a collision management apparatus according to an embodiment.

FIG. 2 shows a method 26 of operating a collision management apparatus. The method 26 may generally be implemented in a handheld device such as, for example, one or more of the handheld devices 14, 16 (FIG. 1), already discussed. More particularly, the method 26 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 28 determines whether one or more new data samples are available in a buffer or other memory structure that stores motion data and audio data. If so, block 30 may obtain motion data and block 32 may obtain audio data. The motion data may generally originate from the sampling of one or more signals generated by an inertial sensor such as for example, an accelerometer and/or gyroscope embedded in the handheld device. Additionally, the audio data may originate from the sampling of one or more signals generated by a microphone or other sound transducer also embedded in the handheld device. Thus, blocks 30 and 32 may include retrieving the motion data and the audio data from one or more buffers in response to the availability detected at block 28.

Block 34 may determine whether a collision has occurred between the handheld device and another object based on the motion data and the audio data. If a collision is detected, illustrated block 36 provides for removing noise from the motion data and the audio data to obtain filtered collision data, wherein one or more features of the collision may be identified at block 38. Although filtering the motion and audio data may improve the quality of the feature identifications, block 36 may be bypassed depending on the circumstances. The features may include, for example, a maximum value (e.g., maximum acceleration and/or audio level), a minimum value (e.g., minimum acceleration and/or audio level), a baseline value, a linear acceleration integration (e.g., change in acceleration over time), a Euler angle integration (e.g., change in three-dimensional/3D orientation over time), an audio frequency spectrum, a post-collision vibration frequency spectrum, etc., or any combination thereof.

Illustrated block 40 compares the one or more features to training data and classifies the impacted object based on the comparison. The training data may be collected offline (e.g., beforehand) with respect to known and/or controlled objects (e.g., body parts, handheld devices, etc.). In this regard, the sound made when a handheld device strikes another object may differ depending on the type of object being struck. For example, soft tissue and clothing may have substantially different sound generation qualities and/or attributes relative to, for example, metal or plastic. Thus, block 40 might include classifying the object in real-time as a person, a handheld object, and so forth, based on a detected similarity between the filtered collision data (e.g., including audio data in addition to motion data) and the training data. Moreover, block 42 may trigger a competitive score update and/or an audiovisual effect based on the classification. For example, block 42 might trigger an increase in the score of a competitor if it is determined that the handheld device carried by the competitor collided with the body part of an opponent (e.g., as opposed to the handheld device carried by the opponent). If no collision is detected at block 34, the illustrated method 26 terminates.

Figure 3:
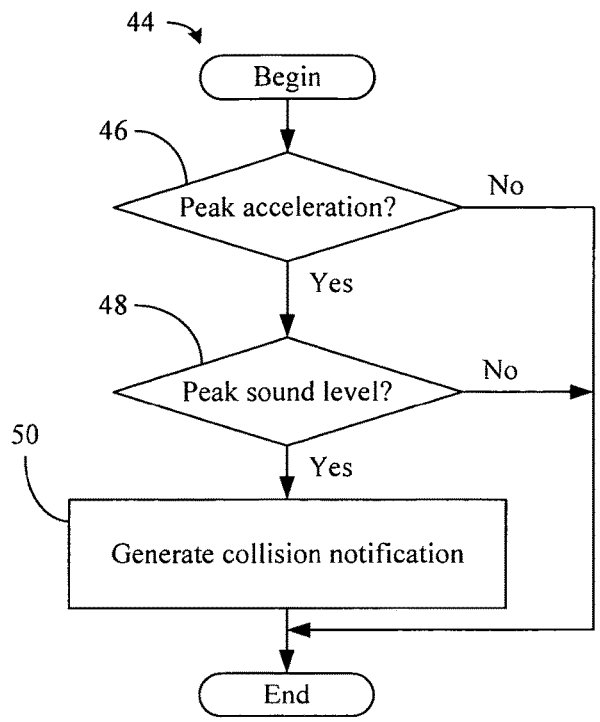
FIG. 3 is a flowchart of an example of a method of detecting collisions according to an embodiment.

FIG. 3 shows a method 44 of detecting collisions. The method 44 may therefore be readily substituted for the block 34 (FIG. 2), already discussed. Moreover, the method 44 may also be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 46 determines whether, based on the motion data, a difference between a peak acceleration and an average acceleration has reached a particular threshold. Thus, block 46 may identify sudden starts or stoppages of motion relative to a recent time base. If the threshold of block 46 has been reached, block 48 may determine whether, based on the audio data, a difference between a peak audio level and an average audio level has reached a particular threshold. Block 48 may therefore leverage the fact that collisions typically generate sound. If the threshold of block 48 has been reached, a collision notification may be generated at block 50.

Figure 4:
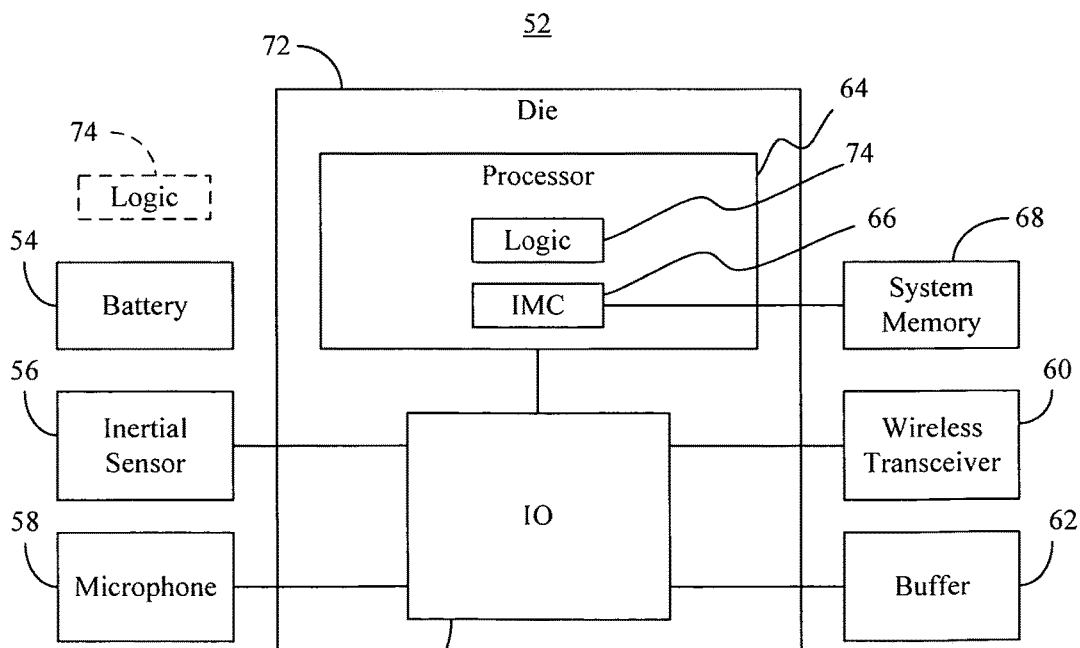
FIG. 4 is a block diagram of an example of a handheld device according to an embodiment.

FIG. 4 shows a handheld device 52 that may be readily substituted for the handheld devices 14, 16 (FIG. 1), already discussed. In the illustrated example, the handheld device 52 includes a battery 54 to supply power to the handheld device 52, an inertial sensor 56 (e.g., accelerometer, gyroscope), a microphone 58, a wireless transceiver 60 (e.g., Bluetooth, Wi-Fi) and a buffer 62. The inertial sensor 56 may generate one or more motion signals and the microphone 58 may generate one or more audio signals, wherein motion data (e.g., samples) associated with the motion signal(s) and audio data (e.g., samples) associated with the audio signal(s) may be stored to the buffer 62. The IO module 70 may sample signals generated by the inertial sensor 56 and the microphone 58, and store the samples to the buffer 62.

The handheld device 52 may also include a processor 64 having an integrated memory controller (IMC) 66, which may communicate with system memory 68. The system memory 68 may include, for example, dynamic random access memory (DRAM) configured as one or more memory modules such as, for example, dual inline memory modules (DIMMs), small outline DIMMs (SODIMMs), etc. The illustrated handheld device 52 also includes an input output (IO) module 70 implemented together with the processor 64 on a semiconductor die 72 as a system on chip (SoC), wherein the IO module 70 functions as a host device and may communicate with, for example, the inertial sensor 56, the microphone 58, the wireless transceiver 60, and the buffer 62. The logic 74 may also be implemented elsewhere in the handheld device 52.

The processor 64 may include logic 74 that is configured to perform one or more aspects of the method 26 (FIG. 2) and/or the method 44 (FIG. 3). Thus, the logic 74, which may include logic instructions, configurable logic, fixed-functionality logic hardware, etc., or any combination thereof, may obtain motion data, obtain audio data and detect a collision between the handheld device 52 and an object based on the motion data and the audio data. In one example, the logic 74 removes noise from the motion data and the audio data to obtain filtered collision data and classifies the object based on the filtered collision data. The wireless transceiver 60 may transmit information regarding the collision to a host system such as, for example, the host system 22 (FIG. 1). In this regard, the logic 74 may trigger one or more of a competitive score update or an audiovisual effect (e.g., simulated battle sounds/lights, crowd cheers) based on whether the object is classified as, for example, a person or a handheld object.

ADDITIONAL NOTES AND EXAMPLES

Example 1 may include a handheld device comprising an inertial sensor to generate one or more motion signals, a microphone to generate one or more audio signals, a wireless transceiver to transmit information regarding a collision between the handheld device and an object, and logic, implemented at least partly in one or more of configurable logic or fixed-functionality logic hardware, to obtain motion data associated with the one or more motion signals, obtain audio data associated with the one or more audio signals, and detect a collision between the handheld device and the object based on the motion data and the audio data.

Example 2 may include the handheld device of Example 1, wherein the logic is to remove noise from the motion data and the audio data to obtain filtered collision data, and classify the object based on the filtered collision data.

Example 3 may include the handheld device of Example 2, wherein the logic is to identify one or more features of the collision, wherein the one or more features are to include one or more of a maximum value, a minimum value, a baseline value, a linear acceleration integration, a Euler angle integration, an audio frequency spectrum or a post-collision vibration frequency spectrum, and compare the one or more features to training data to classify the object.

Example 4 may include the handheld device of Example 2, wherein the object is to be classified as one of a person or a handheld object and the logic is to trigger one or more of a competitive score update or an audiovisual effect based on whether the object is classified as a person or a handheld object.

Example 5 may include the handheld device of Example 1, further including one or more buffers, wherein the logic is to detect an availability of one or more new data samples, and retrieve the motion data and the audio data from the one or more buffers in response to the availability.

Example 6 may include the handheld device of any one of Examples 1 to 5, wherein the logic is to determine, based on the motion data, that a difference between a peak acceleration and an average acceleration has reached a first threshold, and determine, based on the audio data, that a difference between a peak audio level and an average audio level has reached a second threshold.

Example 7 may include the handheld device of any one of Examples 1 to 5, further including a housing having a sword form factor.

Example 8 may include a collision management apparatus comprising logic, implemented at least partly in one or more of configurable logic or fixed-functionality logic hardware, to obtain motion data, obtain audio data, and detect a collision between a handheld device and an object based on the motion data and the audio data.

Example 8 may include a collision management apparatus comprising logic, implemented at least partly in one or more of configurable logic or fixed-functionality logic hardware, to obtain motion data, obtain audio data, and detect a collision between a handheld device and an object based on the motion data and the audio data.

Example 9 may include the apparatus of Example 8, wherein the logic is to remove noise from the motion data and the audio data to obtain filtered collision data, and classify the object based on the filtered collision data.

Example 10 may include the apparatus of Example 9, wherein the logic is to identify one or more features of the collision, wherein the one or more features are to include one or more of a maximum value, a minimum value, a baseline value, a linear acceleration integration, a Euler angle integration, an audio frequency spectrum or a post-collision vibration frequency spectrum, and compare the one or more features to training data to classify the object.

Example 11 may include the apparatus of Example 9, wherein the object is to be classified as one of a person or a handheld object and the logic is to trigger one or more of a competitive score update or an audiovisual effect based on whether the object is classified as a person or a handheld object.

Example 12 may include the apparatus of Example 8, wherein the logic is to detect an availability of one or more new data samples, and retrieve the motion data and the audio data from one or more buffers in response to the availability.

Example 13 may include the apparatus of any one of Examples 8 to 12, wherein the logic is to determine, based on the motion data, that a difference between a peak acceleration and an average acceleration has reached a first threshold, and determine, based on the audio data, that a difference between a peak audio level and an average audio level has reached a second threshold.

Example 14 may include a method of operating a collision management apparatus, comprising obtaining motion data, obtaining audio data, and detecting a collision between a handheld device and an object based on the motion data and the audio data.

Example 15 may include the method of Example 14, further including removing noise from the motion data and the audio data to obtain filtered collision data, and classifying the object based on the filtered collision data.

Example 16 may include the method of Example 15, wherein classifying the object includes identifying one or more features of the collision, wherein the one or more features include one or more of a maximum value, a minimum value, a baseline value, a linear acceleration integration, a Euler angle integration, an audio frequency spectrum or a post-collision vibration frequency spectrum, and comparing the one or more features to training data.

Example 17 may include the method of Example 15, wherein the object is classified as one of a person or a handheld object and the method further includes triggering one or more of a competitive score update or an audiovisual effect based on whether the object is classified as a person or a handheld object.

Example 18 may include the method of Example 14, wherein obtaining the motion data and the audio data includes detecting an availability of one or more new data samples, and retrieving the motion data and the audio data from one or more buffers in response to the availability.

Example 19 may include the method of any one of Examples 14 to 18, wherein detecting the collision includes determining, based on the motion data, that a difference between a peak acceleration and an average acceleration has reached a first threshold, and determining, based on the audio data, that a difference between a peak audio level and an average audio level has reached a second threshold.

Example 20 may include at least one computer readable storage medium comprising a set of instructions, which when executed by a handheld device, cause the handheld device to obtain motion data, obtain audio data, and detect a collision between the handheld device and an object based on the motion data and the audio data.

Example 21 may include the at least one computer readable storage medium of Example 20, wherein the instructions, when executed, cause the handheld device to remove noise from the motion data and the audio data to obtain filtered collision data, and classify the object based on the filtered collision data.

Example 22 may include the at least one computer readable storage medium of Example 21, wherein the instructions, when executed, cause the handheld device to identify one or more features of the collision, wherein the one or more features are to include one or more of a maximum value, a minimum value, a baseline value, a linear acceleration integration, a Euler angle integration, an audio frequency spectrum or a post-collision vibration frequency spectrum, and compare the one or more features to training data to classify the object.

Example 23 may include the at least one computer readable storage medium of Example 21, wherein the object is to be classified as one of a person or a handheld object and the instructions, when executed, cause the handheld device to trigger one or more of a competitive score update or an audiovisual effect based on whether the object is classified as a person or a handheld object.

Example 24 may include the at least one computer readable storage medium of Example 20, wherein the instructions, when executed, cause the handheld device to detect an availability of one or more new data samples, and retrieve the motion data and the audio data from one or more buffers in response to the availability.

Example 25 may include the at least one computer readable storage medium of any one of Examples 20 to 24, wherein the instructions, when executed, cause the handheld device to determine, based on the motion data, that a difference between a peak acceleration and an average acceleration has reached a first threshold, and determine, based on the audio data, that a difference between a peak audio level and an average audio level has reached a second threshold.

Example 26 may include a collision management apparatus comprising means for obtaining motion data, means for obtaining audio data, and means for detecting a collision between a handheld device and an object based on the motion data and the audio data.

Example 27 may include the apparatus of Example 26, further including means for removing noise from the motion data and the audio data to obtain filtered collision data, and means for classifying the object based on the filtered collision data.

Example 28 may include the apparatus of Example 27, wherein the means for classifying the object includes means for identifying one or more features of the collision, wherein the one or more features include one or more of a maximum value, a minimum value, a baseline value, a linear acceleration integration, a Euler angle integration, an audio frequency spectrum or a post-collision vibration frequency spectrum, and means for comparing the one or more features to training data.

Example 29 may include the apparatus of Example 27, wherein the object is to be classified as one of a person or a handheld object and the apparatus further includes means for triggering one or more of a competitive score update or an audiovisual effect based on whether the object is classified as a person or a handheld object.

Example 30 may include the apparatus of Example 26, wherein the means for obtaining the motion data and the audio data includes means for detecting an availability of one or more new data samples, and means for retrieving the motion data and the audio data from one or more buffers in response to the availability.

Example 31 may include the apparatus of any one of Examples 26 to 30, wherein means for detecting the collision includes means for determining, based on the motion data, that a difference between a peak acceleration and an average acceleration has reached a first threshold, and means for determining, based on the audio data, that a difference between a peak audio level and an average audio level has reached a second threshold.

Techniques described herein may therefore analyze data associated with accelerometers, gyroscopes, microphones, etc., and detect collisions based on the analysis. The analysis may consider both the aftershocks of collisions and the sound produced by the collisions in order to determine the strength of impact and type of object that was struck. The techniques may be used in a wide variety of handheld device applications such as, for example, LIGHTSABERS, video games, sports (e.g., martial arts weapons, baseball bats, tennis rackets, golf clubs), material analysis (e.g., measuring the degree of wood rot in a structure, finding studs), and so forth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A handheld device comprising:
   an inertial sensor to generate one or more motion signals;
   a microphone to generate one or more audio signals;
   a wireless transceiver to transmit information regarding a collision between the handheld device and an object; and
   logic, implemented at least partly in one or more of configurable logic or fixed-functionality logic hardware, to:
      obtain motion data associated with the one or more motion signals,
      obtain audio data associated with the one or more audio signals,
      detect the collision between the handheld device and the object based on the motion data and the audio data, and
      classify the object as one of a person or a second handheld device based on filtered collision data, wherein classification of the object includes operations to: distinguish between a first audible sound generation quality of a first strike event and a different second audible sound generation quality of a second strike event, wherein the first strike event is of the handheld device contacting the second handheld device and the second strike event is of the handheld device contacting the person, wherein the first strike event is to have the first audible sound generation quality based at least in part on a material of the second handheld device, and wherein the second strike event is to have the different second audible sound generation quality based at least in part on a material of the person.

2. The handheld device of claim 1, wherein the logic is to:
   remove noise from the motion data and the audio data to obtain the filtered collision data.

3. The handheld device of claim 2, wherein the logic is to:
   identify one or more features of the collision, wherein the one or more features are to include one or more of a maximum value, a minimum value, a baseline value, a linear acceleration integration, a Euler angle integration, an audio frequency spectrum or a post-collision vibration frequency spectrum, and
   compare the one or more features to training data to classify the object.

4. The handheld device of claim 2, wherein the logic is to trigger one or more of a competitive score update or an audiovisual effect based on whether the object is classified as the person or the second handheld device.

5. The handheld device of claim 1, further including one or more buffers, wherein the logic is to:
   detect an availability of one or more new data samples, and
   retrieve the motion data and the audio data from the one or more buffers in response to the availability.

6. The handheld device of claim 1, wherein the logic is to:
   determine, based on the motion data, that a difference between a peak acceleration and an average acceleration has reached a first threshold, and
   determine, based on the audio data, that a difference between a peak audio level and an average audio level has reached a second threshold.

7. The handheld device of claim 1, further including a housing having a form of a sword, saber, foil, epee, or blade.

8. An apparatus comprising:
   logic, implemented at least partly in one or more configurable logic or fixed-functionality logic hardware, to:
   obtain motion data,
   obtain audio data,
      detect a collision between a handheld device and an object based on the motion data and the audio data, and
      classify the object based on filtered collision data, wherein the object to be classified is one of a person or a second handheld device, and wherein the classification of the object includes: distinguishing between a first audible sound generation quality of a first strike event and a different second audible sound generation quality of a second strike event, wherein the first strike event is of the handheld device contacting the second handheld device and the second strike event is of the handheld device contacting the person, wherein the first strike event is to have the first audible sound generation quality based at least in part on a material of the second handheld device, and wherein the second strike event is to have the different second audible sound generation quality based at least in part on a material of the person.

9. The apparatus of claim 8, wherein the logic is to:
   remove noise from the motion data and the audio data to obtain the filtered collision data.

10. The apparatus of claim 9, wherein the logic is to:
    identify one or more features of the collision, wherein the one or more features are to include one or more of a maximum value, a minimum value, a baseline value, a linear acceleration integration, a Euler angle integration, an audio frequency spectrum or a post-collision vibration frequency spectrum, and
    compare the one or more features to training data to classify the object.

11. The apparatus of claim 9, wherein the logic is to trigger one or more of a competitive score update or an audiovisual effect based on whether the object is classified as the person or the second handheld device.

12. The apparatus of claim 8, wherein the logic is to: detect an availability of one or more new data samples, and retrieve the motion data and the audio data from one or more buffers in response to the availability.

13. The apparatus of claim 8, wherein the logic is to:
    determine, based on the motion data, that a difference between a peak acceleration and an average acceleration has reached a first threshold, and
    determine, based on the audio data, that a difference between a peak audio level and an average audio level has reached a second threshold.

14. A method comprising:
    obtaining motion data;
    obtaining audio data;
    detecting a collision between a handheld device and an object based on the motion data and the audio data, and
    classifying the object based on filtered collision data, wherein the object to be classified is one of a person or a second handheld device, and wherein the classification of the object includes: distinguishing between a first audible sound generation quality of a first strike event and a different second audible sound generation quality of a second strike event, wherein the first strike event is of the handheld device contacting the second handheld device and the second strike event is of the handheld device contacting the person, wherein the first strike event has the first audible sound generation quality based at least in part on a material of the second handheld device, and wherein the second strike event has the different second audible sound generation quality based at least in part on a material of the person.

15. The method of claim 14, further including:
    removing noise from the motion data and the audio data to obtain the filtered collision data.

16. The method of claim 15, wherein classifying the object includes: identifying one or more features of the collision, wherein the one or more features include one or more of a maximum value, a minimum value, a baseline value, a linear acceleration integration, a Euler angle integration, an audio frequency spectrum or a post-collision vibration frequency spectrum; and
    comparing the one or more features to training data.

17. The method of claim 15, wherein the method further includes triggering one or more of a competitive score update or an audiovisual effect based on whether the object is classified as the person or the second handheld device.

18. The method of claim 14, wherein obtaining the motion data and the audio data includes:
    detecting an availability of one or more new data samples; and
    retrieving the motion data and the audio data from one or more buffers in response to the availability.

19. The method of claim 14, wherein detecting the collision includes:
    determining, based on the motion data, that a difference between a peak acceleration and an average acceleration has reached a first threshold; and
    determining, based on the audio data, that a difference between a peak audio level and an average audio level has reached a second threshold.

20. At least one computer readable storage medium comprising a set of instructions, which when executed by a handheld device, cause the handheld device to:
    obtain motion data;
    obtain audio data;
    detect a collision between the handheld device and an object based on the motion data and the audio data, and
    classify the object based on filtered collision data, wherein the object to be classified is one of a person or a second handheld device, and wherein the classification of the object includes: distinguishing between a first audible sound generation quality of a first strike event and a different second audible sound generation quality of a second strike event, wherein the first strike event is of the handheld device contacting the second handheld device and the second strike event is of the handheld device contacting the person, wherein the first strike event is to have the first audible sound generation quality based at least in part on a material of the second handheld device, and wherein the second strike event is to have the different second audible sound generation quality based at least in part on a material of the person.

21. The at least one computer readable storage medium of claim 20, wherein the instructions, when executed, cause the handheld device to:
remove noise from the motion data and the audio data to obtain the filtered collision data.

22. The at least one computer readable storage medium of claim 21, wherein the instructions, when executed, cause the handheld device to:
identify one or more features of the collision, wherein the one or more features are to include one or more of a maximum value, a minimum value, a baseline value, a linear acceleration integration, a Euler angle integration, an audio frequency spectrum or a post-collision vibration frequency spectrum; and
compare the one or more features to training data to classify the object.

23. The at least one computer readable storage medium of claim 21, wherein the instructions, when executed, cause the handheld device to trigger one or more of a competitive score update or an audiovisual effect based on whether the object is classified as the person or the second handheld device.

24. The at least one computer readable storage medium of claim 20, wherein the instructions, when executed, cause the handheld device to:
detect an availability of one or more new data samples; and
retrieve the motion data and the audio data from one or more buffers in response to the availability.

25. The at least one computer readable storage medium of claim 20, wherein the instructions, when executed, cause the handheld device to:
determine, based on the motion data, that a difference between a peak acceleration and an average acceleration has reached a first threshold; and
determine, based on the audio data, that a difference between a peak audio level and an average audio level has reached a second threshold.

* * * * *